US011909159B2

(12) United States Patent
Huang

(10) Patent No.: US 11,909,159 B2
(45) Date of Patent: Feb. 20, 2024

(54) CRIMPING PLIER

(71) Applicant: Hanlong Industrial Co., Ltd., New Taipei (TW)

(72) Inventor: Chien-Wei Huang, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 719 days.

(21) Appl. No.: 17/029,163

(22) Filed: Sep. 23, 2020

(65) Prior Publication Data

US 2022/0021169 A1 Jan. 20, 2022

(30) Foreign Application Priority Data

Jul. 20, 2020 (TW) ................................ 109209257

(51) Int. Cl.
*H01R 43/04* (2006.01)
*H01R 43/042* (2006.01)
*B25B 27/14* (2006.01)

(52) U.S. Cl.
CPC ......... *H01R 43/042* (2013.01); *B25B 27/143* (2013.01)

(58) Field of Classification Search
CPC .... B21D 39/04; B21D 39/048; H01R 43/042; H01R 43/045; B25B 27/143
See application file for complete search history.

(56) References Cited

U.S. PATENT DOCUMENTS 5,309,751 A * 5/1994 Ryan .................... H01R 43/042 72/450
2015/0040638 A1* 2/2015 Yen ....................... B25B 27/146 72/409.14

* cited by examiner

*Primary Examiner* — Debra M Sullivan
(74) *Attorney, Agent, or Firm* — Best & Flanagan LLP

(57) ABSTRACT

The crimping plier of the present invention includes an abutting member, a crimping member, a crimping tooth member, a cover plate, and a driving mechanism. The abutting member has a crimping hole for placing the connection terminal. The crimping member is adjacent to the crimping hole, and one end of an elastic element abuts against the crimping member. The crimping tooth member is fixedly disposed on the crimping member. The cover plate is connected to the abutting member and covers the crimping member, and the cover plate is also in contact with the other end of the elastic element. The driving mechanism is in contact with the crimping member to push the crimping member and the crimping tooth member. When the crimping member and the crimping tooth member slide, the elastic element provides an elastic force between the crimping member and the cover plate.

6 Claims, 3 Drawing Sheets

CRIMPING PLIER

BACKGROUND

1. Field of the Invention

The present invention relates to a crimping plier, and more particularly, to a crimping plier that can reduce shaking during crimping.

2. Description of the Related Art

With the widespread use of the Internet, most people have broadband access installed in their homes. At present, most of the Internet access at home is provided by wired means; that is, the signal is transmitted through a network cable laid by the telecommunication company. In addition, the network cable needs to be electrically connected to an electronic device through a network terminal, wherein a crimping plier used for crimping the connection terminal and the connection cable is required. The crimping operation is done by connecting the connection cable to the connection terminal and placing it into the crimping hole, and then using the crimping member to fix the connection terminal and the connection cable. However, due to manufacturing and assembly tolerances of the prior art crimping plier, the crimping member is prone to shaking due to the large gaps between components during crimping, which could affect the crimping quality.

Therefore, it is necessary to propose a new design of a crimping plier to solve the problems encountered in the prior art.

SUMMARY OF THE DISCLOSURE

It is an object of the present invention to provide a crimping plier which can reduce shaking during crimping.

In order to achieve the above object, the present invention provides a crimping plier for crimping a connection terminal and a connection cable. The crimping plier comprises an abutting member, a crimping member, a crimping tooth member, a cover plate, and a driving mechanism. The abutting member has a crimping hole for placing the connection terminal. The crimping member is adjacent to the crimping hole, and the crimping member has a slot for disposing an elastic element such that one end of the elastic element abuts against the crimping member. The crimping tooth member is fixedly disposed on the crimping member. The cover plate is connected to the abutting member and covers the crimping member, and the cover plate is also in contact with the other end of the elastic element. The driving mechanism is in contact with the crimping member to push the crimping member and the crimping tooth member such that when the user operates the driving mechanism, the crimping member and the crimping tooth member will slide toward the crimping hole to crimp the connection terminal and the connection wire. When the crimping member and the crimping tooth member slide, the elastic element provides an elastic force between the crimping member and the cover plate.

DETAILED DESCRIPTION OF THE PREFERRED EMBODIMENTS

In order to make the structure and characteristics as well as the effectiveness of the present invention further understood and recognized, the detailed description of the present invention is provided as follows along with embodiments and accompanying figures.

Figure 1:
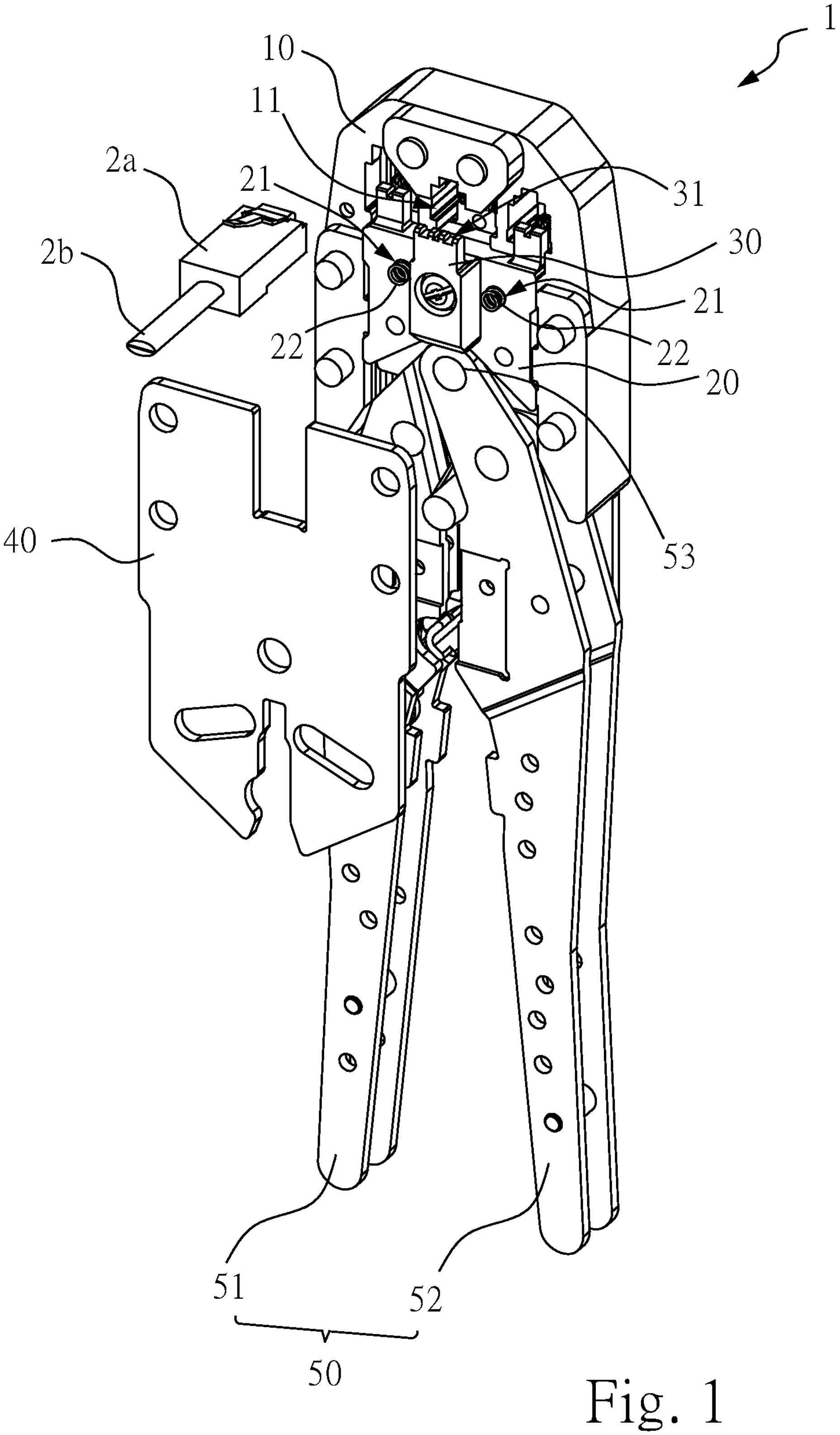
FIG. 1 illustrates a schematic diagram of the assembly of a crimping plier of the present invention.

In the following, first refer to FIG. 1 for a schematic diagram of the assembly of a crimping plier of the present invention and FIG. 2 for a front view of the crimping plier of the present invention. It should be noted that although the following description uses the terms "first", "second", etc. to describe various elements, these elements should not be limited by these terms. These terms are only used to distinguish one element from another element. For example, without departing from the scope of the various embodiments, the first clamp handle may be referred to as the second clamp handle, and similarly, the second clamp handle may be called the first clamp handle. The first clamp handle and the second clamp handle are both clamp handles, but they are not the same one.

A crimping plier 1 of the present invention is used for crimping a connection terminal 2*a* and a connection cable 2*b*. The crimping plier 1 includes an abutting member 10, a crimping member 20, a crimping tooth member 30, a cover plate 40, and a driving mechanism 50. The abutting member 10 has at least one crimping hole 11, and the crimping hole 11 is configured to fit the size of the connection terminal 2*a* to place the connection terminal 2*a*. The crimping member 20 is adjacent to the crimping hole 11. The crimping tooth member 30 is fixed on the crimping member 20. The crimping tooth member 30 and the crimping member 20 can be integrally formed, or the crimping tooth member 30 can be fixedly disposed on the crimping member 20 by a connecting member. The crimping tooth member 30 may have a dentate structure 31 to match the specifications of the connection terminal 2*a*; however, the dentate structure 31 of the present invention is not limited to the shape shown in FIG. 1, and there can be more than one crimping tooth members 30 and crimping holes 11. The cover plate 40 is connected to the side of the abutting member 10 and can cover the crimping member 20, as shown in FIG. 2. Therefore, the crimping member 20 will not be exposed so as to improve the aesthetic appearance of the crimping plier 1 and to protect the internal structure of the crimping plier 1. The driving mechanism 50 is in contact with the crimping member 20 to push the crimping member 20 and the crimping tooth member 30 such that when the connection terminal 2*a* is connected to the connection cable 2*b* and is then placed in the crimping hole 11, the user can operate the driving mechanism 50 to push the crimping member 20 and the crimping tooth member 30 to slide toward the crimping hole 11 to complete crimping of the connection terminal 2*a* and the connection cable 2*b*.

In an embodiment of the present invention, the driving mechanism 50 may comprise a first clamp handle 51, a second clamp handle 52 and other connecting rod elements (not shown in figure). The second clamp handle 52 is pivotally connected with the first clamp handle 51 to rotate mutually. Since the crimping member 20 is connected with a pivot 53, when the user presses the first clamp handle 51 and the second clamp handle 52, the first clamp handle 51, the second clamp handle 52 and other connecting rod elements can work together to allow the pivot 53 to push the crimping member 20. In this way, the crimping member 20 and the crimping tooth member 30 can slide toward the crimping hole 11 to complete crimping of the connection terminal 2*a* and the connection cable 2*b*. Since the driving mechanism 50 can use various implementations to achieve the purpose of pushing the crimping member 20, the present invention is not limited to the above-mentioned method, and the structure of the driving mechanism 50 will not be further described for the sake of brevity as it is not the main purpose of the present invention.

The crimping member 20 has at least one slot 21. In this embodiment, the crimping member 20 is provided with a pair of slots 21, but the invention is not limited thereto. Two slots 21 are provided on the left and right sides of the crimping tooth member 30, the distance between the two slots 21 and the crimping tooth member 30 can be the same, and each slot 21 is disposed with an elastic element 22.

Figure 2:
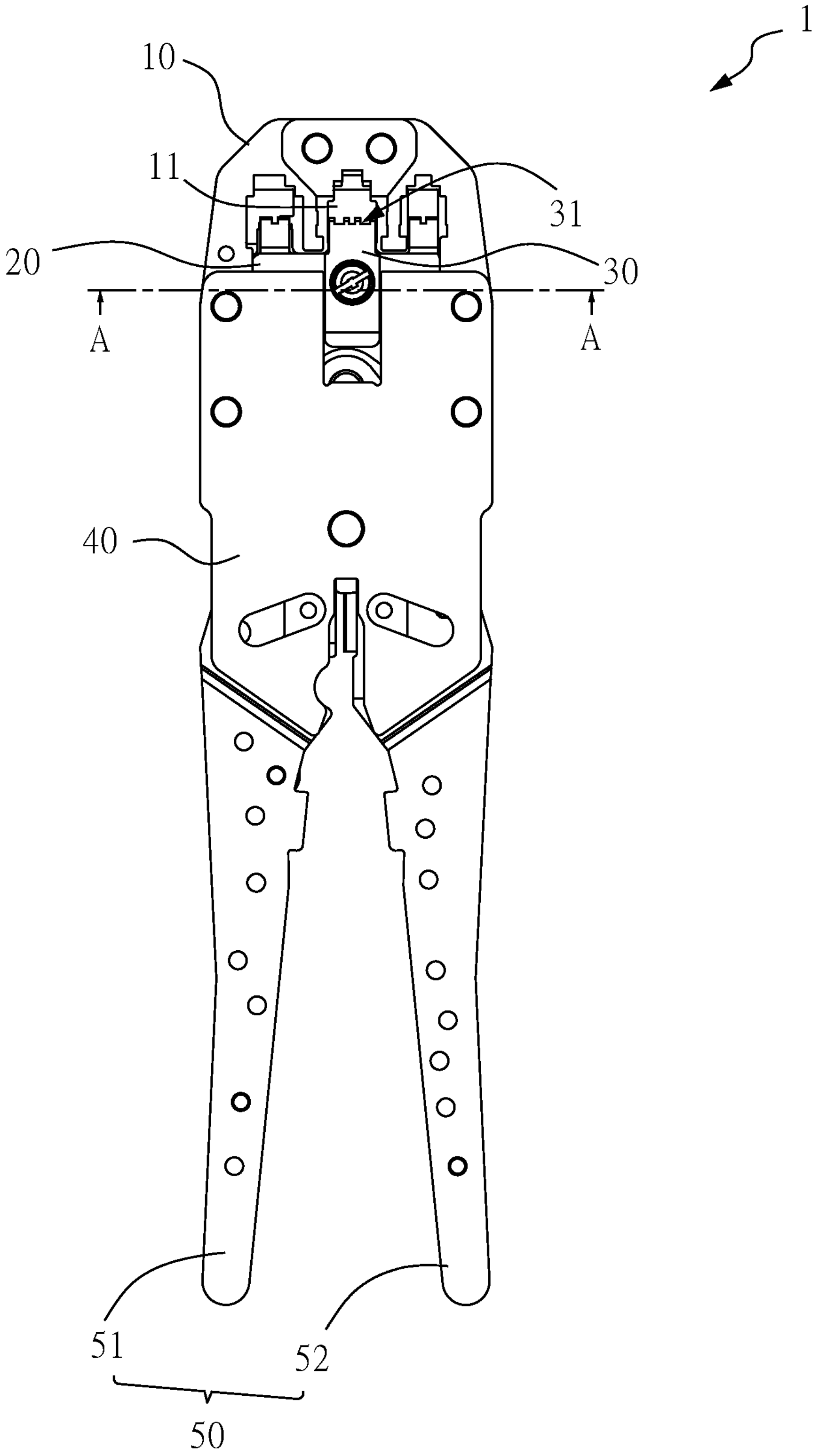
FIG. 2 illustrates a front view of the crimping plier of the present invention.
Figure 3A:
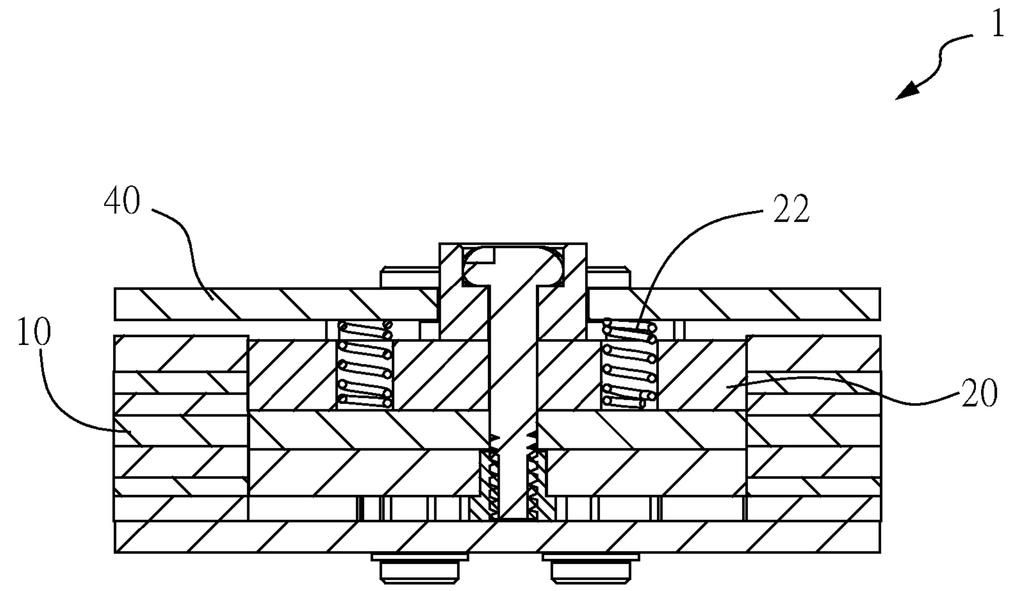
FIG. 3A illustrates a cross-sectional view of the elastic element of the crimping plier along the A-A side of FIG. 2 when the elastic element of the crimping plier is not pressed.
Figure 3B:
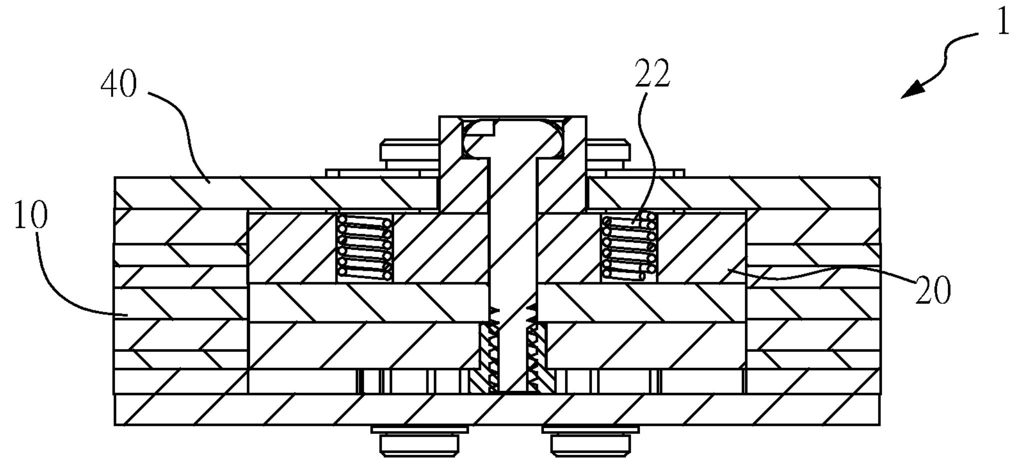
FIG. 3B illustrates a cross-sectional view of the elastic element of the crimping plier along the A-A side of FIG. 2 when the elastic element of the crimping plier is pressed.

Please also refer to FIG. 3A for a cross-sectional view of the elastic element of the crimping plier along the A-A side of FIG. 2 when the elastic element of the crimping plier is not pressed, and to FIG. 3B for a cross-sectional view of the elastic element of the crimping plier along the A-A side of FIG. 2 when the elastic element of the crimping plier is pressed.

One end of the elastic element 22 abuts against the crimping member 20, and the other end of the elastic element 22 is in contact with the cover plate 40. Therefore, when the crimping member 20 and the crimping tooth member 30 slide, the elastic element 22 provides an elastic force between the crimping member 20 and the cover plate 40. In general, the crimping member 20 may be farther away from the cover plate 40 (as shown in FIG. 3A), and when the user operates the driving mechanism 50, the crimping member 20 may be tilted toward the cover plate 40 (as shown in FIG. 3B). At this time, the elastic element 22 can provide elastic force to return the crimping member 20 to its original position, which can reduce the shaking of the crimping member 20.

It can be seen from the above description that the crimping plier 1 of this present invention uses the disposed elastic element 22 to prevent the crimping member 20 from shaking too much during crimping and can effectively improve the crimping quality of the crimping plier 1.

It should be noted that the embodiments of the present invention described above are only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules. All without departing from the scope of the invention are defined solely by the appended claims.

What is claimed is:

1. A crimping plier for crimping a connection terminal and a connection cable, the crimping plier comprising:

an abutting member having a crimping hole for placing the connection terminal;

an elastic element;

a crimping member adjacent to the crimping hole, the crimping member having a slot for disposing the elastic element, wherein one end of the elastic element abuts against the crimping member within the slot of the crimping member;

a crimping tooth member fixedly disposed on the crimping member;

a cover plate connected to the abutting member and covering the crimping member, the cover plate being in contact with the other end of the elastic element; and a driving mechanism in contact with the crimping member to push the crimping member and the crimping tooth member such that when a user operates the driving mechanism, the crimping member and the crimping tooth member can slide toward the crimping hole to crimp the connection terminal and the connection wire, and when the crimping member and the crimping tooth member slide, the elastic element provides an elastic force between the crimping member and the cover plate to reduce a shaking of the crimping member.

2. The crimping plier as claimed in claim 1, wherein the driving mechanism comprises:

a first clamp handle; and a second clamp handle pivotally connected with the first clamp handle, wherein the crimping member is connected to a pivot of the first clamp handle and the second clamp handle such that when the user presses the first clamp handle and the second clamp handle, the crimping member can be pushed by the pivot joint.

3. The crimping plier as claimed in claim 1, wherein the crimping tooth member has a dentate structure.

4. A crimping plier for crimping a connection terminal and a connection cable, the crimping plier comprising:

an abutting member having a crimping hole for placing the connection terminal;

a plurality of elastic elements, each elastic element having a first end and a second end;

a crimping member adjacent to the crimping hole, the crimping member comprises two slots, each slot being disposed with each elastic element respectively, wherein the first end of one elastic elements abuts one of the slots;

a crimping tooth member fixedly disposed on the crimping member;

a cover plate connected to the abutting member and covering the crimping member, the cover plate being in contact with the second ends of the elastic elements; and a driving mechanism in contact with the crimping member and the crimping tooth member such that when a user operates the driving mechanism, the crimping member and the crimping tooth member can slide toward the crimping hole to crimp the connection terminal and the connection wire, and when the crimping member and the crimping tooth member slide, the elastic element provides an elastic force between the crimping member and the cover plate to reduce a shaking of the crimping member.

5. The crimping plier as claimed in claim 4, wherein the pair of slots is disposed on the left and right sides of the crimping tooth member respectively.

6. The crimping plier as claimed in claim 5, wherein a distance between each one of the pair of slots and the crimping tooth member is the same.

* * * * *